June 20, 1961  J. E. VISTAIN, JR  2,989,311
RECORD PLAYER SPEED CONTROL
Filed July 1, 1957  7 Sheets-Sheet 1
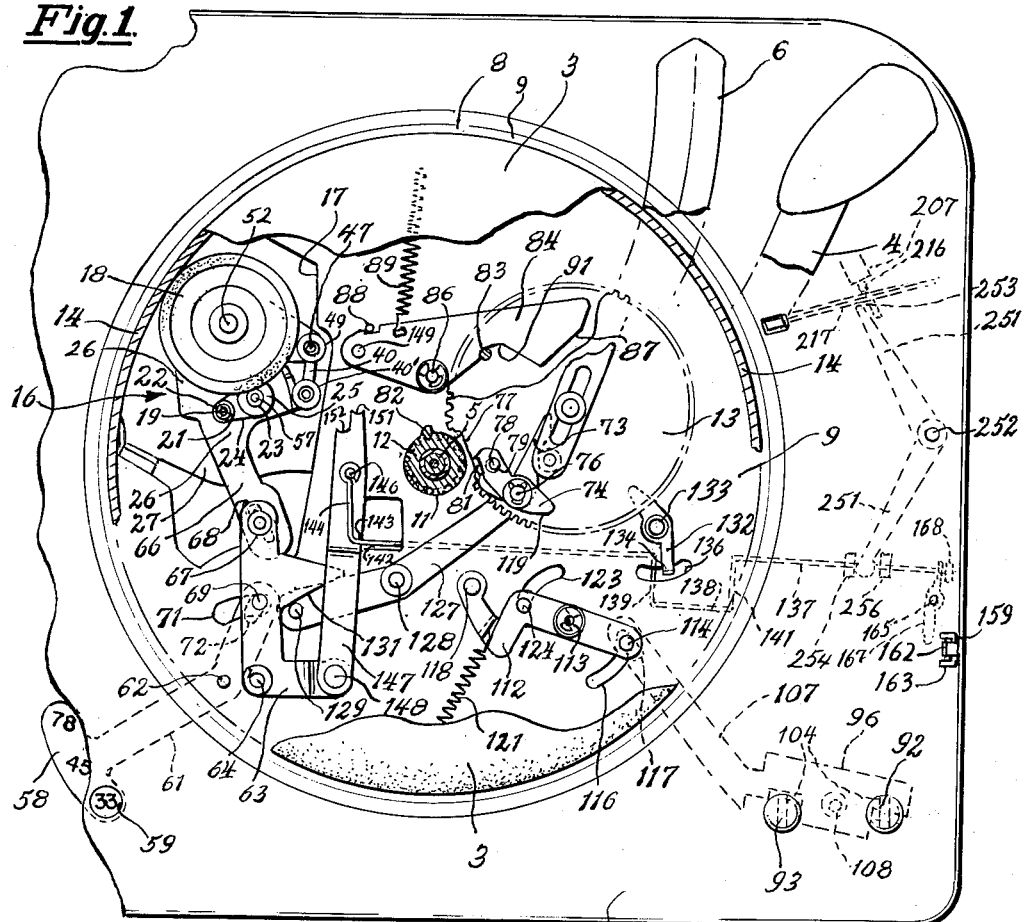
Fig.1.
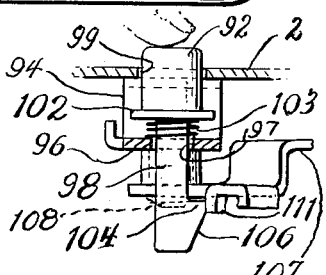
Fig.3.
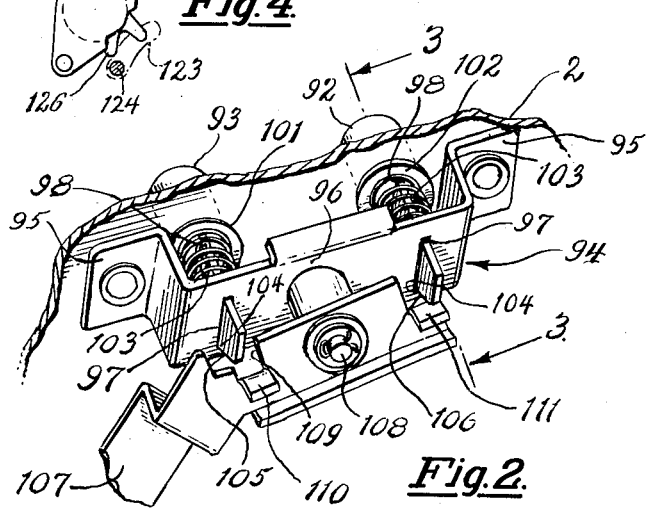
Fig.4.
Fig.2.
INVENTOR.
James E. Vistain Jr.
BY
J. W. Douglas
HIS ATTORNEY

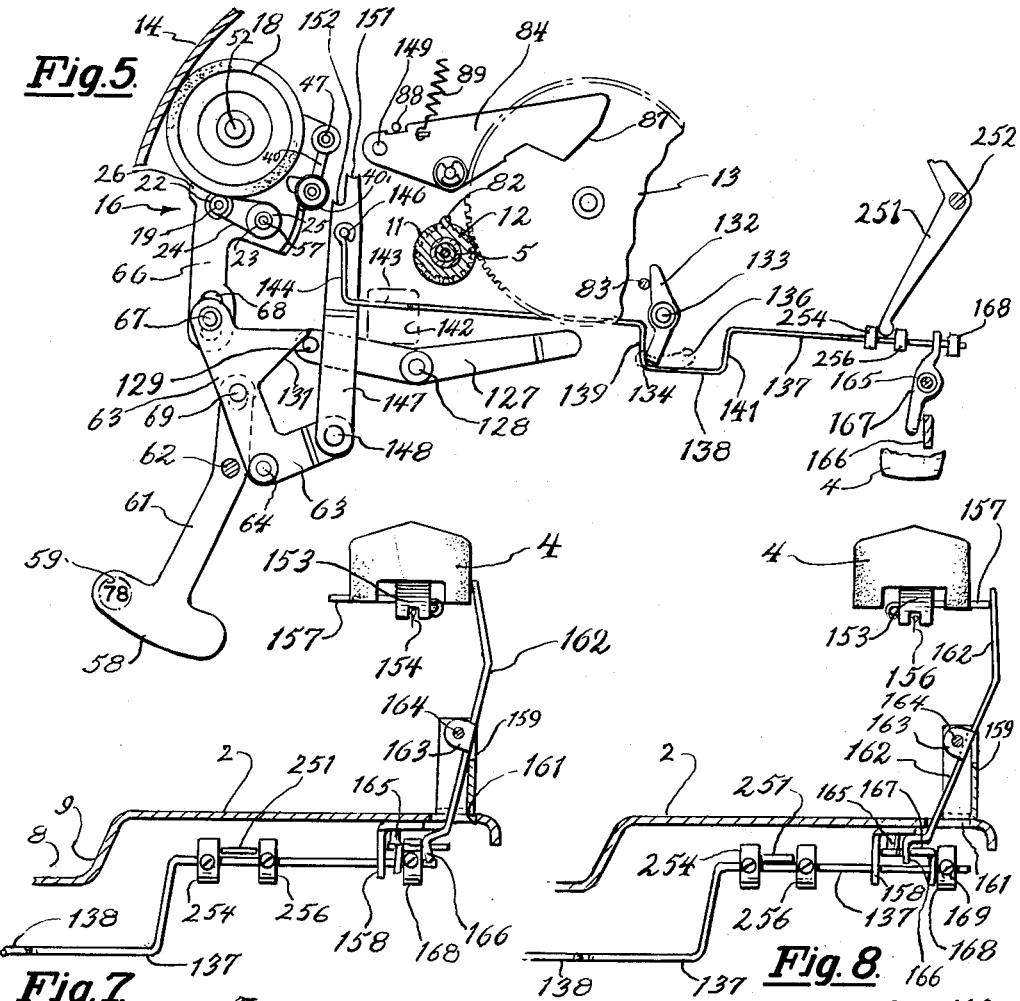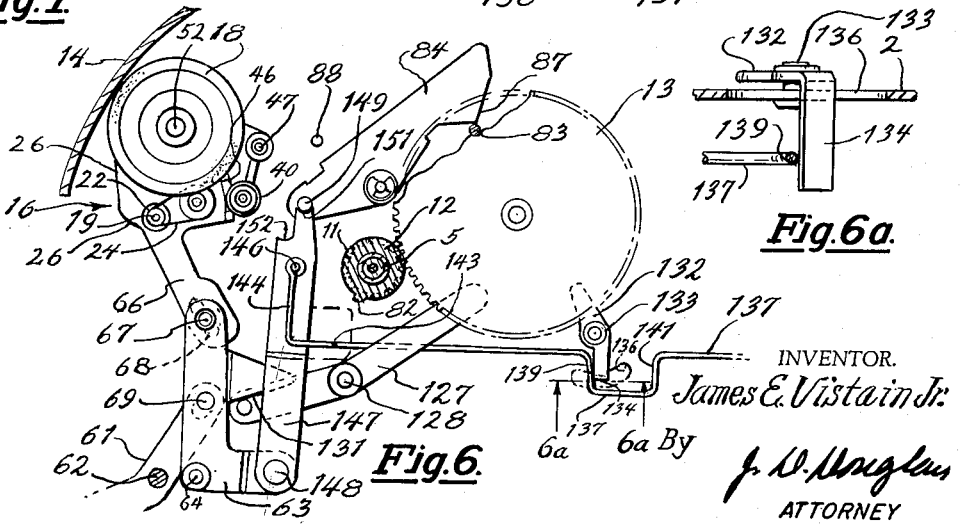

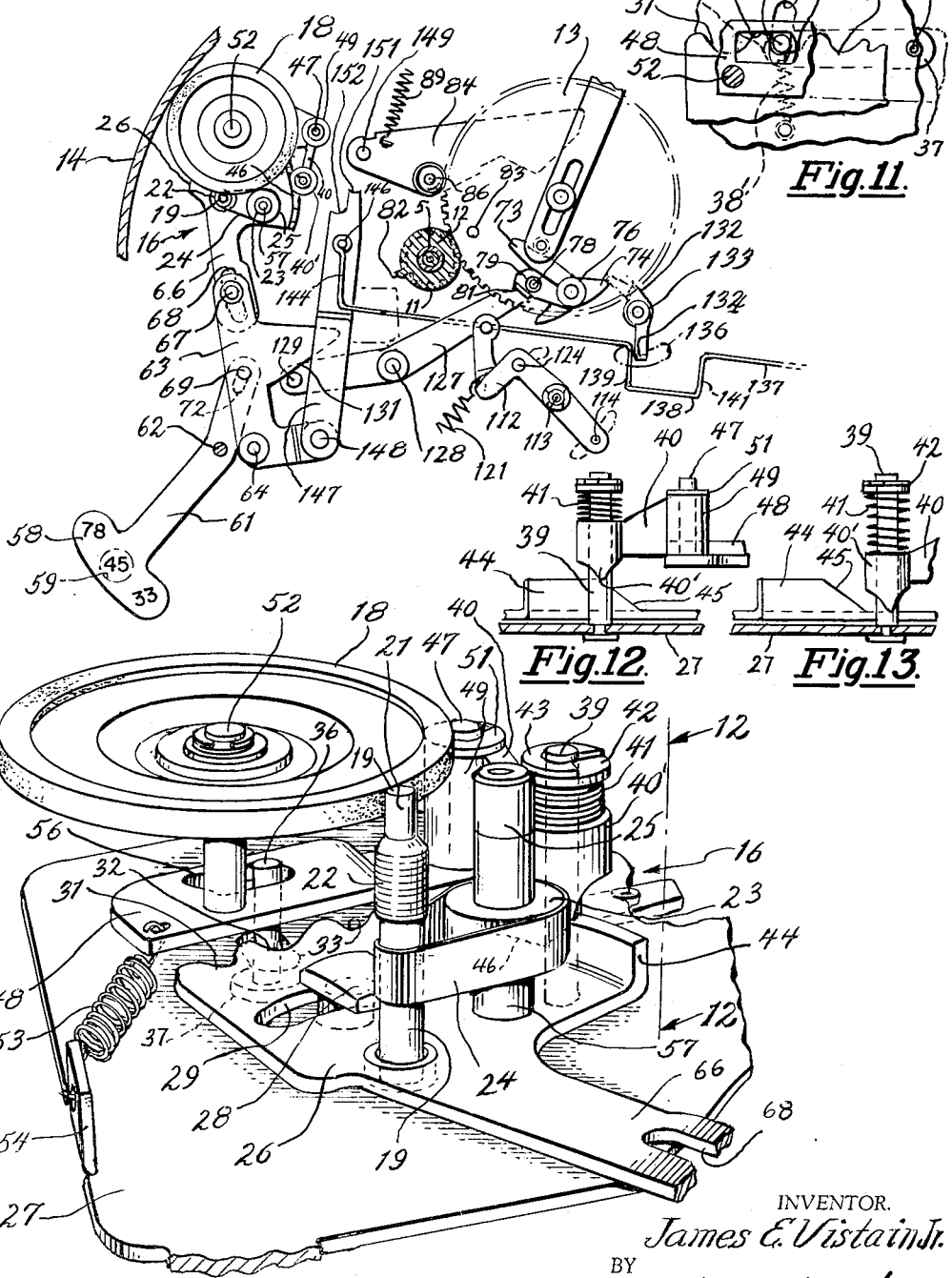

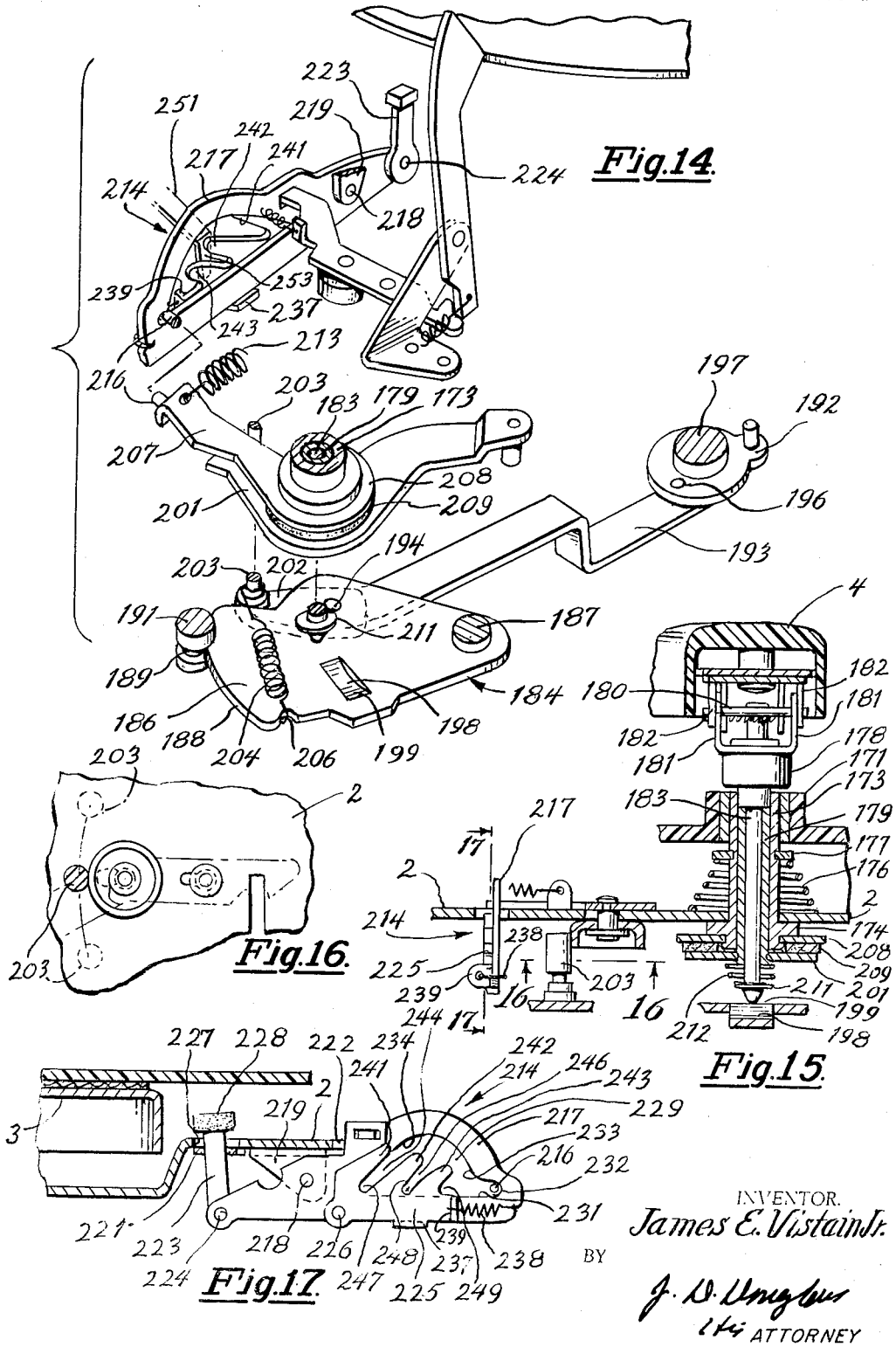

June 20, 1961 J. E. VISTAIN, JR 2,989,311
RECORD PLAYER SPEED CONTROL
Filed July 1, 1957
7 Sheets-Sheet 5
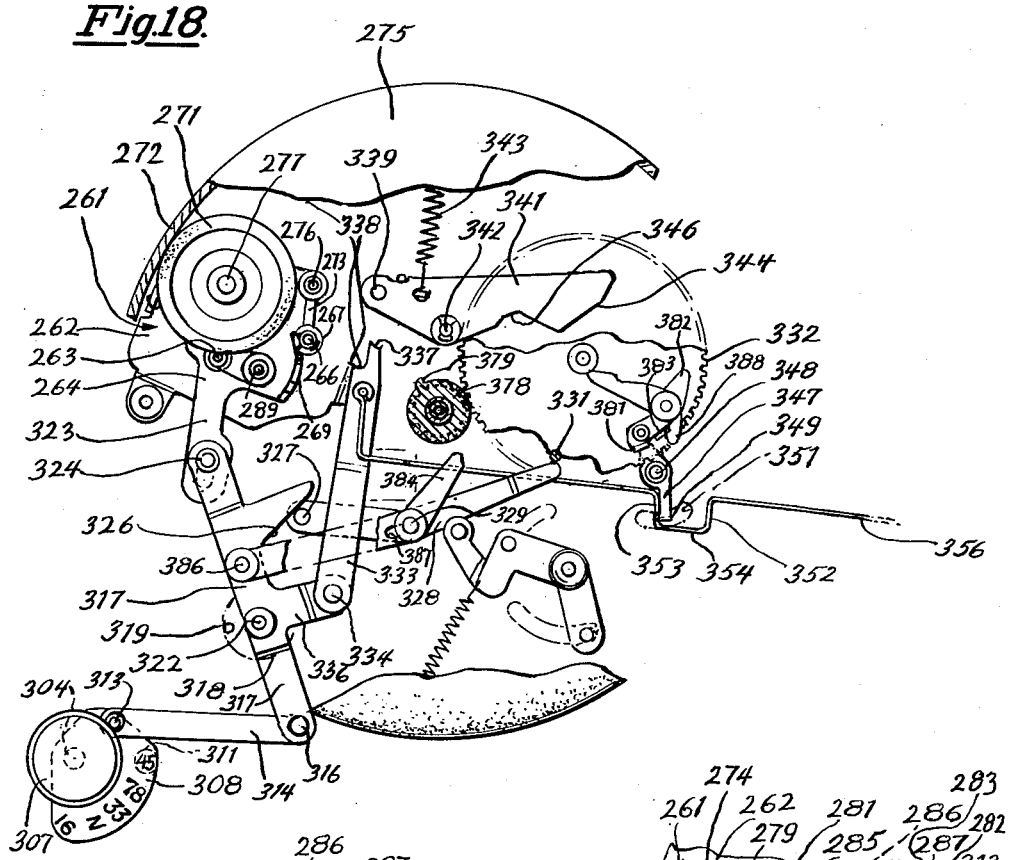
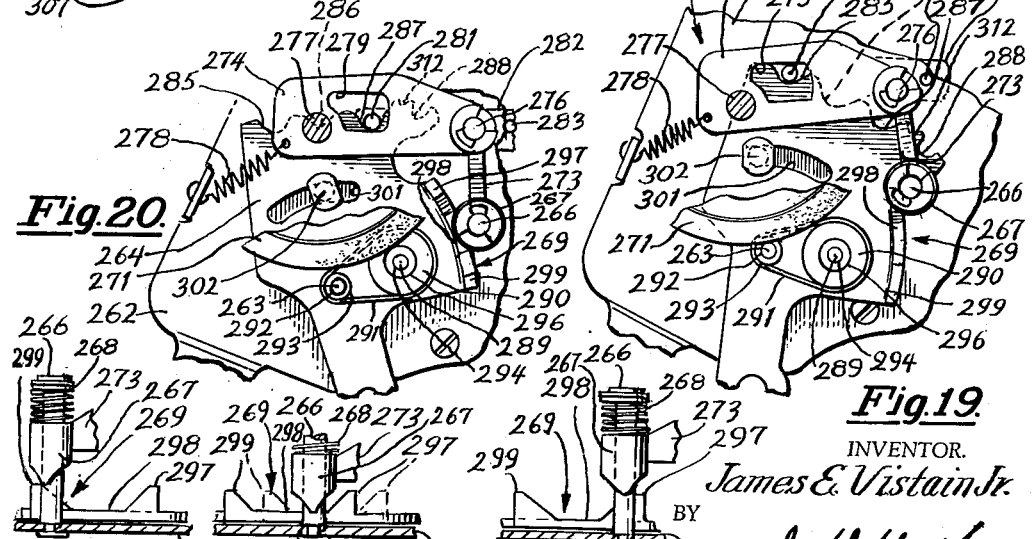
INVENTOR.
James E. Vistain Jr.
BY
ATTORNEY

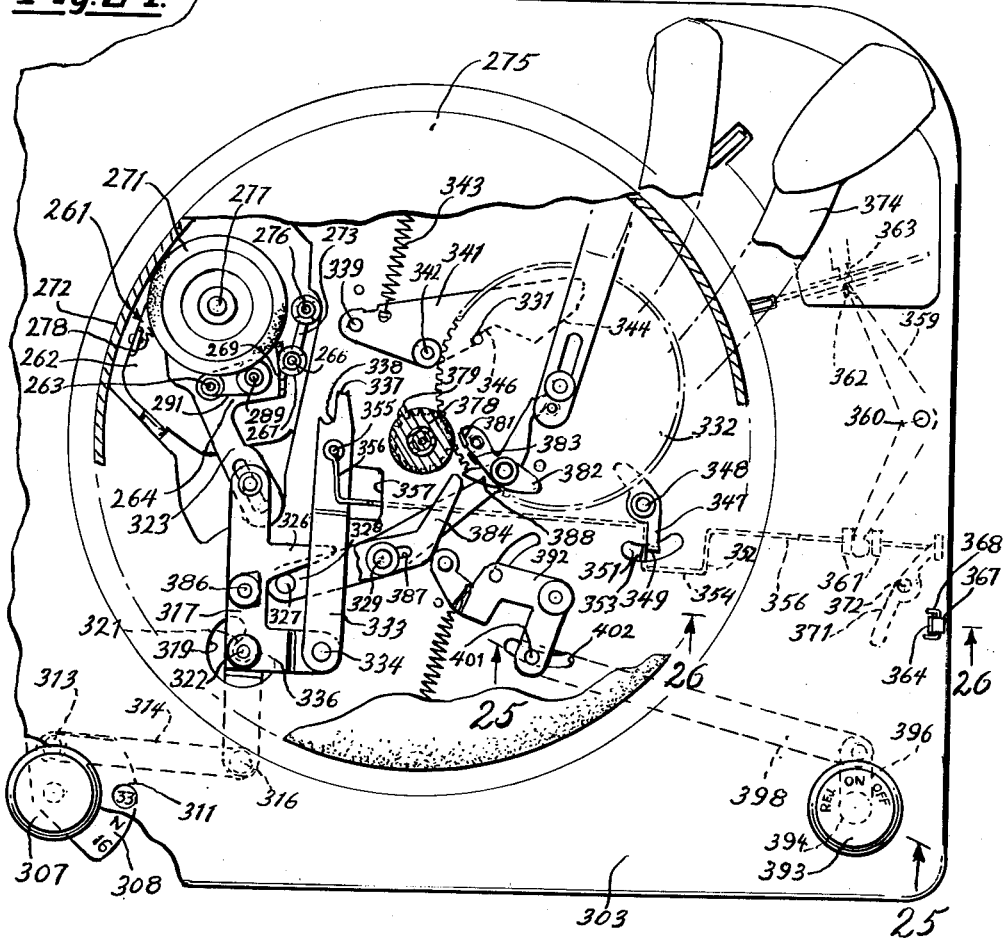
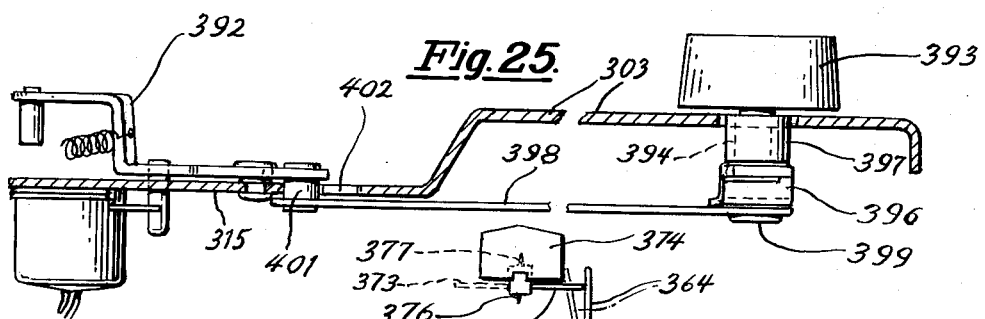

June 20, 1961    J. E. VISTAIN, JR    2,989,311
RECORD PLAYER SPEED CONTROL
Filed July 1, 1957    7 Sheets-Sheet 7
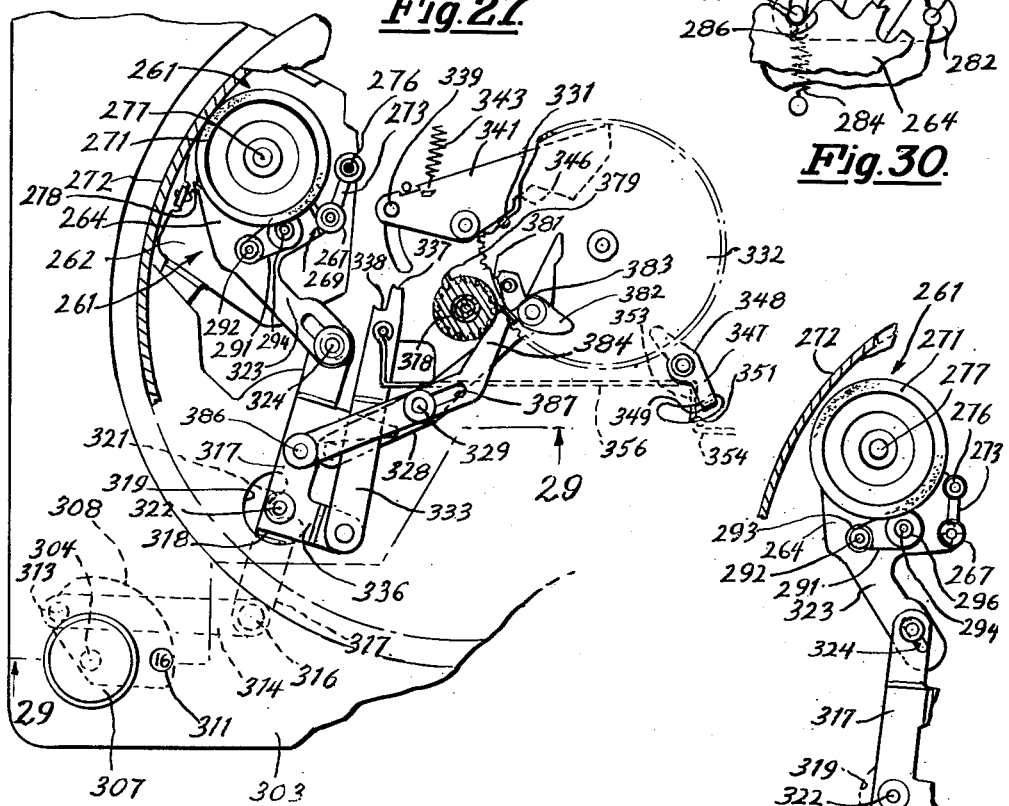
Fig.27.
Fig.30.
Fig.28.
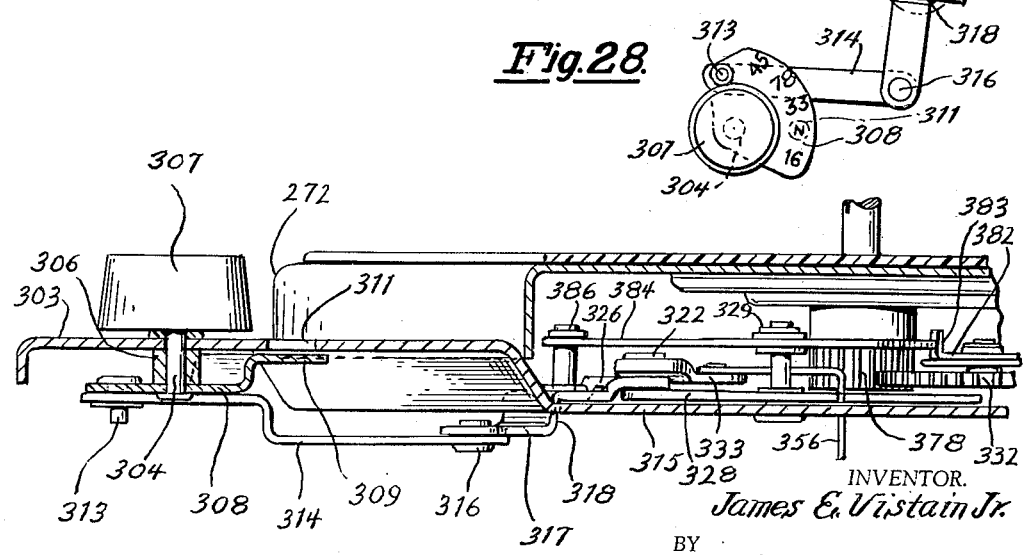
Fig.29.
INVENTOR.
James E. Vistain Jr.
BY
ATTORNEY United States Patent Office 2,989,311
Patented June 20, 1961

2,989,311
RECORD PLAYER SPEED CONTROL
James E. Vistain, Jr., Skokie, Ill., assignor to Admiral Corporation, Chicago, Ill., a corporation of Delaware
Filed July 1, 1957, Ser. No. 669,176
10 Claims. (Cl. 274—9)

This invention relates to improvements in automatic record players for playing records differing in rotative speed at which they may be reproduced best. More specifically, the invention relates to mechanism, in combination with an automatic record player, for automatically changing the speed of a driven turntable to conform to the reproduction speed of a given record delivered to said turntable.

Although provision, in automatic record players of prior construction, was made for adjusting the turntable speed, adjustment was manual. As a result, the turntable speed adjustment was frequently overlooked when a record, just placed on the turntable, called for reproduction at a different turntable speed. This resulted in defectively reproduced sound, and defective tracking of the record by the pickup arm.

Due to the present invention, the likelihood of a record being reproduced at an improper speed has been greatly reduced due to the automatic feature. Consequently, an operator of one of the new record players is relieved of the responsibility of making speed adjustments preparatory to playing a given record. Also as a result, pickup apparatus and records can be expected to give satisfactory service over a longer period of time than would records when reproduced by the older apparatus.

Other advantages of the invention will be set forth in part hereinafter and in part will be obvious herefrom, or may be learned by practice with the invention, the same being realized and attained by means of the instrumentalities and combinations pointed out in the appended claims.

In the drawings:

FIG. 1 is a top plan view of an automatic record changer embodying the invention in a setting for playing a 33⅓ r.p.m. record, parts being broken away;

FIG. 2 is a fragmentary perspective view of the manual control mechanism as viewed from below the level of the base plate;

FIG. 3 is a vertical section taken on line 3—3 of FIG. 2;

FIG. 4 is a top plan view of the switch and operating means therefor;

FIG. 5 is a view corresponding to FIG. 1 when the parts are in a setting for reproducing 78 r.p.m. records, some of the parts being omitted;

FIG. 6 is a view corresponding to FIG. 5 when the parts are in a setting for reproducing 33⅓ r.p.m records;

FIG. 6a is a fragmentary vertical section, drawn to an enlarged scale, taken on line 6a—6a of FIG. 6;

FIGS. 7 and 8 are end views of the pickup arm and stylus control in different settings in addition to associated parts shown sectionally;

FIG. 9 is a view corresponding to FIG. 5 when the parts are in a setting for playing 45 r.p.m. records;

FIG. 10 is a fragmentary perspective view of the drive unit, drawn to an enlarged scale and parts being broken away;

FIG. 11 is a fragmentary top plan view of the position cam of the shifter and associated parts;

FIGS. 12 and 13 are elevational views which are partly sectional of the vertically effective cam and associated follower in different positions;

FIG. 14 is an exploded perspective view, showing control mechanism for determining the tone arm set down positions for records differing in size.

FIG. 15 is an elevational view of the tone arm suspension, parts thereof being broken away;

FIG. 16 is a fragmentary horizontal section taken on line 16—16 of FIG. 15;

FIG. 17 is a fragmentary vertical section taken on line 17—17 of FIG. 15;

FIG. 18 is a view corresponding to FIG. 1, showing a second embodiment of the invention, wherein the parts are in a setting for playing 45 r.p.m. records;

FIG. 19 is a top plan view of the drive unit in its setting for playing 78 r.p.m. records, parts of the unit being broken away;

FIG. 20 is a view corresponding to FIG. 19, showing the drive unit in readiness for driving the turntable at 33⅓ r.p.m;

FIGS. 21, 22, and 23 are sectional views, but largely in elevation, taken on the line 21—21 of FIG. 19, to illustrate different settings of the parts for playing records of different speeds;

FIGS. 24 is a view corresponding to FIG. 18 showing the parts in their setting for playing 33⅓ r.p.m records;

FIG. 25 is a vertical section taken on line 25—25 of FIG. 24 and drawn to an enlarged scale;

FIG. 26 is a view corresponding to FIG. 7, of parts of the alternative construction;

FIG. 27 is a view corresponding to FIG. 24, showing the parts in their setting when 16 r.p.m. records are reproduced;

FIG. 28 is a view corresponding to FIG. 27, parts being deleted, to illustrate positions of the parts when the drive unit is out of driving communication with the turntable;

FIG. 29 is a vertical section, partly in elevation, taken on line 29—29 of FIG. 27; and FIG. 30 is a fragmentary view of a detent mechanism.

While the present invention is capable of use in combination with record players having magazines of other types, its use will be indicated in connection with a record player of the class in which a stack of records may be magazined above the level of a turntable on a shouldered spindle at the center of a turntable, as disclosed in my co-pending application filed November 8, 1951, Serial No. 255,344. Therefore, only adequate mechanism to afford a setting for the novel feature of this machine will be indicated. Details of this record player, shown in FIG. 1, include a base 2 for support of a turntable 3 at the axis of which is a spindle 5 and beside which are supported a pickup arm 4 and a keeper 6, the latter being movable longitudinally of its vertical axis and rotatable thereabout so that it may be extended over the stack of records for preventing the records from tipping about their support. The turntable is received in a well or recess 8, partly defined by a circular offset wall portion 9 of the base 2. For its support from the wall 9, the turntable includes a hub 11, which is toothed to provide a pinion 12 for intermittent driving cooperation with a mutilated gear 13, also supported, for rotation, from the wall 9. At its periphery, the turntable also has a depending peripheral flange 14 extending freely into the well 8.

The turntable 3 acquires rotation from a drive unit or motive unit 16. The latter is supported at an aperture 17 in the base wall 9 by any suitable means. It has a floating idler wheel 18 for frictional driving engagement with the turntable flange 14 and a motor shaft 19, FIG. 10, from which the idler is driven. The motor shaft 19 is formed at its upper end with a pair of pulleys 21 and 22, differing in diameter. The shaft drives an idler pulley 23 by an endless belt 24; the pulley 23 also being integral with another pulley 25 arranged to be carried into driving cooperation with the idler 18. Structural features enabling this to be carried out include a shifter plate 26. It is pivoted to a motor support plate 27 at the shaft 19 about which it is arranged to swing. The swing of the shifter is limited, however, by a pin 28 on the plate 27, the pin extending through a slot 29, in the shifter 26, which is arcuate of the drive shaft 19. Predetermined angular positions for the shifter are provided as follows: The shifter, FIG. 11 is formed with a plurality of notches 31, 32, and 33 on its edge, the alignment of which is arcuate of the shaft 19. The edge of the shifter with the row of notches extends transversely of a slot 34, in the support plate 27, FIG. 11, through which a detent pin 36 extends. The pin 36 is arranged to engage in any one of the notches for holding the shifter in a predetermined position. The pin is carried by the swingable end of an arm 37, pivoted to the plate 27 at 38, and biased by a spring 38' to urge the pin 36 into engagement with edge of the shifter 24.

When the idler 18 is driven by the pulley 22, FIG. 10, the turntable is driven at a speed of approximately 78 r.p.m. When the idler 18 is driven by the pulley 21, the turntable is operated at a speed of 45 r.p.m. For these variations in turntable speed, the idler 18 is shifted axially and laterally. Means by which this is effected includes a post 39 which is fixed to the motor support plate 27 and carries thereon, for axial and swinging motion, a follower arm 40 and integral follower 40'. The latter is biased into engagement with a cam 44, which extends arcuately of the shaft 19 on the shifter 26, by a compression spring 41. The consequent cooperation between the cam and follower, in addition to force of the spring 41, is therefore responsible for vertical movement of the arm 40 as the shifter is swung about its axis. Additionally, the swingable end of the follower arm 40 includes an integral bearing 49 for a vertical post 47 to the lower end of which a mobile arm 48, FIG. 10, is fixed. The upper end of the post 47 bears a C-washer 51 above the bearing 49, to retain the arm 48 in association with the arm 40. The purpose of the arm 48 is to support the idler 18 which is arranged to rotate on a vertical shaft 52 fixed to the free end of the arm 48. For the idler 18 to be concurrently biased into engagement with the turntable flange 14 and one of the drive pulleys, 21, 22, or 23, a tension spring 53 is anchored between the arm 48 and a lug 54 on the motor support plate 27. It will now be apparent that swinging the shifter 26 about its axis moves the idler 18 vertically to transfer its engagement from one to the other of the pulleys 21 or 22. While being so operated, lateral movement is imparted to the idler 18 in order to facilitate its passage over the junction of pulleys 21 and 22. The provision for this lateral movement of the idler 18 includes an aperture 56, in the arm 48, into which the pin 36 extends and the spring 53 also biases the mobile arm in a direction in which an edge portion defining the aperture 56 presses on the pin 36 tending to urge it into one of the notches 31, 32 or 33, as the case may be. It will, therefore, be understood that as the shifter plate 26 is swung to urge the pin 36 out of the notch it has been engaging that said pin is moved laterally carrying with it the idler 18 which is thus held out of engagement with the pulleys 21 and 22 until the idler is beside the selected pulley.

The pulleys 23 and 25 are supported for rotation on a post 57 fixed to the shifter 26. When the idler 18 is engaged by one of the pulleys of the shaft 19, the pulley 25 is spaced from said idler due to the position of the shifter 26. When, however, the position of the shifter is changed adequately to carry a cam rise 46 under the follower 40', the pulley 25 is concurrently carried into driving engagement with the idler 18 by which the idler is also pressed out of engagement with the pulley 21 to provide a 33⅓ r.p.m. speed for the turntable.

Regardless of how the shifter is moved, the speed of the turntable can be readily determined from an indicator or vane 58, FIG. 1, observable through an aperture 59 in the base plate 2. The indicator 58 may be an integral part of a lever 61 pivoted at 62 to the lower side of the wall 9. The indicator bears indicia, 33, 45, and 78, to denote the speeds at which the turntable is arranged to be alternately driven. The lever 61 is therefore linked to the shifter. This is carried out by means including a bell crank lever 63 pivoted at 64 to the upper side of the wall 9. One end of the lever 63 extends over an arm 66 of the shifter 26 and bears a pin 67 extending downward into a slot 68 in the arm 66. Intermediate its fulcrum 64 and pin 67, the lever 63 carries a second pin 69 which passes through a clearance aperture 71 in the wall 9, and extends into a slot 72 in the lever 61. This assures counterclockwise rotation of the lever 61 whenever the shifter is swung clockwise and clockwise motion of the former when the latter is swung anticlockwise. Thus, the number "33" is carried to a point wherein this indicia is visible below the window 59 when the pulley 25 drivingly engages the idler 18. When idler 18 is moved into engagement with the pulley 21 the numeral "45" on the vane is concurrently moved to a point below the window for observation, and concurrently the vane 58 is moved to carry the character "78" into view with transfer of driving engagement of the idler 18 to the pulley 22.

Whenever a record is rejected, automatically or manually, operation of cyclical mechanism is initiated. This mechanism forms the subject matter of my co-pending application Serial No. 161,370, filed May 11, 1950, now U. S. Patent No. 2,795,429 of June 11, 1957 and therefore will not be described in detail. It may be timely, however, to point out that it involves a pair of trip members 73 and 74, FIG. 1, pivoted at 76 to the gear 13 at a point adjacent a notch or break 77 in the continuity of the teeth of the gear. Both of the members 73 and 74 are in frictional and slight pressure engagement with each other so that turning one about its axis also imparts turning motion to the other of the members. The member 73 may swing through nearly a revolution about its axis while the operation of the member 74 is restricted by a pin or stop 78 on the gear 13 and extending through a hole 79 in the member 74. The latter carries an upturned lug 81, which when carried clockwise to one of its limit is out of the course of a striker 82 carried by the turntable hub 11, but when carried counterclockwise to its other limit is in the course of the striker. When in the latter position, and consequently engaged by said striker, just enough rotary motion is imparted to the gear 13 to cause meshing engagement between the teeth thereof and the pinion 12. When the gear is driven through a revolution during which a stud 83, fixed to the lower side of the gear, is carried into engagement with a cam latch lever 84 pivoted at 86 to the wall 9. The consequent cooperation between a cam 87, on the lever 84, and the moving stud 83 is sufficient to rock the lever counterclockwise away from a fixed stop 88 and against the force of a spring 89 anchored to the lever and to the wall 9. As the stud 83 is carried past the highest point on the cam 87 the lever 84 is rocked clockwise until the stud 83 is engaged by a notch 91 on the lever. The gear 13 has then completed a revolution and a record changing cycle has been completed, since the gear has been restored to its position with the notch 77 opposite to the pinion 12. The gear 13 is then releasably retained against rotation during reproduction of a record.

To understand the means for manually initiating a cycle of the gear 13, reference should be made to FIG. 1, wherein it will be noted that a pair of push buttons 92 and 93 are arranged at one corner of the base plate. To the bottom of the base plate 2, adjacent the push buttons 92 and 93, a yoke or U-shaped guide bracket 94 is fixed at its ends. It includes an offset central portion 96, offset relative to upper end portions 95 which are fixed to the base 2. The portion 96 is formed with spaced-apart, rectangular shaped apertures 97 to receive, for vertical sliding motion therein, shanks 98 on which the push buttons 92 and 93 are formed, the latter extending freely through holes 99 in the base plate. For limiting their upward movement, the lower ends of the push buttons, below the base 2, are formed with flanges 101 and 102 of diameter greater than that of the holes 99. The push buttons are biased upwardly by compression springs 103 coiled about the shanks 98 and confined between the push buttons 92 and 93 and the offset portion of the bracket 96. Below the bracket part 96, the shanks are formed with lateral ears 104 having thereon cam faces 105 and 106. Their purpose is to swing a lever 107, in alternate directions, about its pivot provided by a shouldered post 108, supported from the lower side of the bracket 96. The lever 107 is swung counterclockwise, FIG. 1, when the button 92 is depressed and clockwise when the button 93 is depressed. For this to take place the lever 107 is notched at 109 below the shank 98 of button 93 and a follower is formed by a downwardly bent lip 110 for cooperation with the cam 105. A second follower 111, also struck downward from the lever 107 at one end thereof, is arranged to cooperate with the cam 106, when the button 92 is depressed. Extending below the base wall 9, the lever 107, when moved, moves a lever 112 pivoted at 113 to the top of the wall 9. A coupled relationship between these levers is provided by a pin 114 extending downward from one end of the lever 112, through an arcuate clearance slot 116 in the wall 9, and received in a slot 117 longitudinally of the lever 107. On its lower side, the remaining end of the lever 112 carries an operating pin 118 at a level for cooperation with a cam surface 119 on the member 74. The lever 112 is biased counterclockwise about its axis by a tension spring 121, anchored thereto, and to the base 9. Therefore, when the button 92 is depressed, the lever 107 is swung against the force of spring 121 due to cooperation of the cam 106 with the follower 111 until the operating pin 118 engages the cam surface 119 of the trip member 74 which is swung counterclockwise far enough to carry the lug 81 into the course of the striker 82. The gear 13 receives a push which causes meshing engagement thereof with the pinion and consequent rotation of the gear, as previously described.

In FIG. 1 the lever 112 is shown in one of its extreme positions, namely, its initial or stop position. When so arranged, the motor unit 16 is not operating. From this position the lever 112 is swingable to another extreme position or tripping position in which the operating pin 118 actuates the member 74. During movement of the lever 112 between these extreme positions the motor unit 16 is started. This is effected by a switch 122, in circuit with the unit 16, FIG. 4, which is closed during the swinging operation of the lever. The switch 122 is fixed to the lower side of the wall 9 adjacent a slot 123 which is arcuate of the pivot 113. The lever 112 bears a switch operating pin 124 that extends downward through the slot 123 and the switch 122 has a lateral pair of integral fingers 126 between which the pin 124 is carried to close and/or open the switch by moving the fingers.

When pressure on the button 92 is relieved and the flange 101 restored to its normal position of engagement with the plate 2, the lever 112 is moved backward by the spring 121. But the backward movement of the lever 112 is not necessarily to its stop position. This is because the switch 122 is of the toggle variety and offers substantial but yieldable resistance to shifting of the fingers 126 away from their two extreme positions. Advantage is therefore taken of a differential between the biased status of the switch fingers and lever 112 to provide for the latter an operating position, intermediate its two extreme positions, in which the switch remains closed, due to the inability of spring 121 to overcome the resistance of the switch fingers to be moved from their closed position. Therefore, additional force is called for to manually return the lever 112 to its initial position for stopping the unit 16. This is afforded by the follower 110 and cam 105, operable by depressing the push button 93 to swing the lever 107 clockwise, FIG. 1, and move the lever 112 back to its stop position.

In the course of a cycle of the gear 13 the motive unit 16 is first automatically adjusted to operate the turntable at a speed of 78 revolutions per minute. This adjustment is made by a first or speed preset mechanism comprising, in addition to the bell crank lever 63, a preset lever 127 pivoted at 128 to the wall 9 and having one end arranged to extend into the orbit of the stud 83. The remaining end extends into association with the lever 63 where it bears a vertical pin or follower 129 for cooperation with a cam 131 on the lever 63. As it engages the lever 127, the stud 83 swings the lever 127 clockwise about its fulcrum, it in turn swings the lever 63 counterclockwise by carrying the follower 129 into engagement with the cam 131. This causes a clockwise rotation of the shifter plate 26 to a setting at which the turntable is operated at 78 r.p.m. due to the connection, already described, between the lever 63 and shifter 26.

Following the foregoing speed presetting operation, the stud 83 operates a second or selector preset mechanism comprising a dog or preset lever 132, FIG. 5, pivoted at 133 to the upper side of the wall 9. One end of the lever 132 is arranged to extend under the gear 13 in the orbit of the stud 83. The other end of the lever 132 is bent downward to provide a vertical finger 134 passing through a clearance aperture 136 in the wall 9. The lever 132 is in association with a longitudinally slidable selector or indexing rod or slider 137 below the wall 9 where it is formed with an offset 138, including parallel arm portions 139 and 141 between which the finger 134 extends for a lost motion coupled relationship with the slider. Remote from the offset 138, the slider is bent to extend upward, through a clearance aperture 142 in the wall 9, to a second offset 143 which is mounted with a lateral arm 144, the end of which is pivotally anchored at 146 to a gauging or test link 147, adjacent one end of the latter. The remaining end of link 147 is pivotally coupled at 148 to an end of the bell crank lever 63. The stud 83 in passing the lever 132 swings the latter clockwise. As a result, the finger 134 moves the rod 137 to the left by pressing on the arm 139 and it, in turn, swings the link 147 counterclockwise.

To understand, at this point, the significance of the counterclockwise motion imparted to the link 147, it should be remembered that rocking of the lever 84 takes place consequent to cooperation between the stud 83 and the cam 87. This occurs next in the sequence of operations performed by the stud following its cooperation with the lever 132. A vertical pin or pusher 149 carried by the lever 84, at its end remote from the cam 87, is therefore oscillated through an arcuate course as the gear 13 finishes a cycle of its operation. By its counterclockwise motion, the link 147 is moved out of the course of the pusher 149 so that no motion is imparted to the link by the pusher. No rotation being imparted to the lever 63 to swing it clockwise, the lever 127 is not restored to its position in the course of the stud 83. As long as this preset status of the parts prevails, the turntable is operated at 78 r.p.m. This is a condition that is desirable since the pickup arm is arranged to cooperate with records having a wider groove.

In order that the pickup arm 4 may track the finer or micro-groove records which are usually rotated at 33⅓ r.p.m., the link 147 must be swung from its preset position, just described, into the course of the pusher 149. When therein it is moved longitudinally by the pusher to both move the shifter 26 to a new motor speed setting by rocking the bell crank lever 63, at the same time the preset lever 127 is moved into the orbit of stud 83 by pressure of the cam 131 on the pin 129. This is carried out when the gear 13 operates cyclically after an adjustment is made manually on control means in connection with the pickup arm 4. To understand the control means, reference should be made to FIGS. 7 and 8, wherein it will be noted that the pickup arm 4 is provided with a transducer 153 having thereon a pair of needles or stylii 154 and 156. They are preferably on diametrically opposite sides of an axis longitudinally of the arm 4 and are in fixed relation to a handle 157 formed to extend laterally of the tone arm as means for rotating the needles about the axis so that they may be alternately extended downward. The needle 154 is for tracking coarse grooved records and the needle 156 is for tracking fine or micro-grooved records. When the transducer 153 is arranged to track coarse grooved records, the handle 157 extends in a substantially horizontal position on the inner side of the arm 4; that is, extending toward the axis of the turntable. When the transducer is arranged to reproduce micro-groove records, the handle 157 is on the outer side of the arm 4 and is pointing away from the turntable axis in a horizontal manner. In both FIGS. 7 and 8 the tone arm 4 is represented in the same position, which is at the outer extremity of the course through which it is manipulated during cyclic operation of the gear 13.

Adjacent its end remote from the link 147, the rod 137 is supported for longitudinal movement by a lower bracket 158 fixed to the base plate 2 on the lower side thereof. On the upper side of the plate 2 a bracket 159 is also fixed. It extends above the edges of an aperture 161 in the base plate and is U-shaped, transversely thereof, to embrace the sides of a detector or indexing lever 162 having ears 163 pivotally connected to the bracket by a horizontal pin 164. The detector 162 extends through the aperture 161 and upward therefrom to the lever of the handle 157. When swung counterclockwise to its limit, the lever 162 is not disturbed by the arm 4 when said arm is moved to its outermost limit owing to a minute space between the pickup arm and lever at this time, as will be noted in FIG. 7. This is when the handle 157 is on the inner side of the pickup arm. When the handle is turned to the outer side of the pickup arm, FIG. 8, to retract the coarse groove needle and extend the fine groove needle, the lever 162 is engaged by the handle and swung clockwise as the pickup arm is swung to its extreme outermost position.

The lower end of the lever 162 includes an abutment portion or finger 166 for cooperation with one of the ends of a reversal lever 167, FIG. 5, pivoted at 165 to the bracket 158 for motion about a vertical axis. The remaining end of the lever 167 is arranged to cooperate with a collar or cylindrical contactor 168 releasably clamped to the rod 137, adjacent its end, by any suitable means. When, therefore, the rod 137 is shifted to its preset position by cooperation between the stud 83 and offset portion 139, which occurs during each record changing cycle, the collar 168 moves to the left and turns the lever 167 counterclockwise to, in turn, swing the lever 162 to the position shown in FIG. 7.

As already indicated, the needle 154 must be retracted and the needle 156 extended to reproduce micro-groove records. Since the handle 157 is swung to its outward position for this needle arrangement and the handle extends beyond the outer side of the pickup arm, said handle engages the lever 162 which is thus turned clockwise from its preset position to its FIG. 8 position by the handle. As this takes place, the rod 137 is moved to the right, the lever 167 serving to convey this motion thereto from the lower end of lever 162 by pressing on the left side of the collar 168. This motion of rod 137 is of course, accompanied by clockwise motion of the gauging link 147 about its pivot 148 which is just enough to carry a seat or notch 151 at the free end of the link into the course of the pusher 149. Sequentially, the lever 84 then being operated, the pusher 149 moves the link longitudinally to turn the lever 63 clockwise and to rotate the shifter 26 to a setting wherein the motor operates the turntable at 33⅓ r.p.m. The cam 131 again moves the lever 127 back into position for engagement by the pin 83 on the gear 13 during the next cycle.

While thus moving the link 147 longitudinally for one predetermined distance from its preset position provides for a turntable speed of 33⅓ r.p.m., a turntable speed of 45 r.p.m. is achieved by moving the link 147 through a different distance. Therefore the link is formed, adjacent its free end, with another notch or seat 152, similar to the seat 151, but in greater proximity to the pivot 148 than is the seat 151. Additionally, the seat 152 is beyond the course of the pusher 149 when the seat 151 is in the course of said pusher. It is therefore necessary that the rod 137 be swung farther to the right from its preset position than the rod is moved by the handle 157 during a cycle. Therefore other means, to be described hereinafter, are provided for moving the seat 152 into the course of the pusher.

To understand how the rod 137 is displaced for moving the seat 152 into the pusher's course, an explanation of other mechanisms of the record player is timely. They will be described but briefly, however, since it is the subject matter of my copending applications, Serial No. 255,344, filed November 8, 1951, and Serial No. 358,827, filed June 19, 1953, now U.S. Patent No. 2,868,547 of January 13, 1959.

The mounting for the pickup arm 4 includes a pedestal 171, FIG. 15, arranged to provide bearing support for a hollow, vertical shaft 173 journalled therein. The shaft 173 is restrained against axial displacement upward by engagement of a flange 174, at the lower end of shaft 173, with the base plate 2. Axial displacement of the shaft 173 downward is resisted by a compression spring 176 confined between the base plate 2 and a flange 177 on the shaft 173. The shaft 173, in turn, affords bearing support for a second tubular shaft 179 telescoped therein and restrained from axial motion downward by a collar 178 adjustably secured on the shaft and normally in engagement with the pedestal 171. While a vertical axis for the pickup arm 4 is provided by the shaft 179, a horizontal axis therefore is also provided by a pin 180 pivotally coupling a pair of spaced apart arms 181 on the collar 178, to corresponding arms 182 extending downward from the tone arm. Additional features of the connection between the tone arm and its support are described in my copending application, Serial No. 55,801, filed October 21, 1948. The pickup arm 4 is adapted to be tilted or rocked vertically about the rod 180 by vertical motion of a lift pin 183, slidably journalled in the tubular shaft 179.

The lift pin 183 is raised by a swing-out mechanism indicated in its entirety by the reference character 184, FIG. 14. It comprises a cam plate 186 which is pivotally supported on a post 187 carried by the base plate 2. A curved edge 188 of the plate, concentric with the post 187, is disposed in a groove 189 on a guide stud or stop 191, carried by the base plate 2 so that as the plate 186 is moved, support for the outermost portion of the plate is provided and resists binding of the plate on post 187. The alignment of the pivot 187, lift pin 183, and the stud 191 is such as to resist tilting of the plate by the pin 183. The plate 186 is also coupled to a crank plate 192 by a link 193, a first pivot pin 194 connecting the link to the cam plate 186 and a second pivot pin 196 connecting the link to the crank plate so that rotary motion of the crank plate is translated into swinging motion of the plate 186. The crank 192 is rigidly coupled to the gear 13 by a vertical stub shaft 197 and operates with the gear.

The weight of the pickup arm is, of course, partly supported by the record it is tracking. During this process, the lift pin 183 is free of the weight of the pickup arm since said pin rests in a dwell portion 198 of a vertically effective cam 199 on the plate 186. As plate 186 is swung outward at the beginning of its cyclic motion, however, the cam 199 is carried under the lift pin to move it upward. The upward movement of pin 183 is adequate for engagement and support of the pickup arm which is thereby supported in elevated relation to the turntable, or an accumulation of records thereon, until cyclic motion of the plate 186 enables the lift pin to be restored to its record playing position on completion of a cycle.

In order to understand the means by which the pickup arm is moved outward, once it is supported by the lift pin 183, it should be noted that the pickup arm support shaft 179 carries a tone arm control member 201 at its lower end. The member 201 is rigidly fixed to shaft 179 and consequently is swingable laterally with the pickup arm. Also, it should be noted that the pivot pin 194, which connects the link 196 to the cam plate 186, also affords a pivot for connecting a contactor arm 202 to the plate 186. On its swingable end, the arm 202 carries a contactor pin or stop member 203 which is held in engagement with the edge of the cam plate 186 by a spring 204, one end of which is hooked around the pin 203 and the other end of which is hooked in a notch 206 on the edge of said cam plate remote from the contactor. As the contactor is carried in an outward direction, that is, counterclockwise about the post 187, it engages the control member 201 and carries said arm before it to concurrently swing the pickup arm outward, that is, also counterclockwise, engagement of the pin 203 being with the arm at the edge thereof farthest from the observer, as viewed in FIG. 14.

Associated with the operating member 201 is means for regulating the set-down position of the pickup arm 4. Said means includes a control arm or set-down arm 207 which is carried on the lower end of the tubular shaft 173. The set-down arm includes a disc portion 208 around the shaft to which a washer 209, of some suitable friction material such as cork, is secured as by an adhesive. Adjacent its lower end, the lift pin 183 is provided with an annular flange 211 to confine between it and the operating member 201 a compression spring 212 which is coiled about the lift pin 183.

When the lift pin 183 is in engagement with the dwell portion 198 of the cam plate (pickup arm lowered), the spring 212, although intimately associated with the member 201, is not in such a preloaded state as to support the pickup arm, there being a slight clearance of approximately ⅟₃₂″ between the control member 201 and the washer 209. This enables the control member 201 and the pickup arm to swing freely while the pickup arm is tracking a record. As previously indicated when the lift pin 183 is moved upward in the course of a cycle, its motion is conveyed to the control member 201 through the spring 212 and the control member 201 is moved upward into pressure engagement with the friction washer 209. This limited clutch relationship between the control member 212 and arm portion 208, when the lift pin is in elevated position, is responsible for movement of the set-down arm 207 outward or in a counterclockwise direction relative to the position indicated in FIG. 14. This motion of the set-down arm is against the resistance of a tension spring 213 anchored to said arm and to the base 9. The control member 201 and the set-down arm 207 are adapted to be swung into engagement with the stud 191 in order that a preset or predetermined angular relationship may be established between them, the means for automatically selecting the let-down points being described hereinafter.

Inward motion of the arm 207, and hence the control member 201 and its associated pickup arm from the stud 191, is limited by a selector mechanism 214, FIGS. 14 and 17. It, in turn, is subject to adjustment by the size of record on turntable 3 to vary the limit of the inward swing of set-down arm 207, and consequently inward motion of the pickup arm. The limiting operation of the mechanism 214 is effective until the lift pin 183 is lowered whereupon the pickup arm is freed for tracking owing to release of the clutch arms 201 and 207 from driving relation to each other.

The set-down arm 207 carries a selector finger 216 for cooperation with the selector mechanism 214. The latter includes a selector lever 217 pivoted at 218 to a bracket 219, on the lower side of the base 2, the base being apertured at 221 and 222 to provide clearance for movement of the mechanism 214. The selector 214 further includes a detector link or vertically movable member 223 pivoted at 224 to the lever 217 and a toothed interceptor member 225 pivoted at 226 to the lever 217. The link 223 extends through an aperture 227 in the bracket 219 for vertical movement beside the turntable 3 and bears at its upper end a rubber reach pad 228 for intermittent movement to a level above the top of the turntable 3. The lever 217, to the right of the pivot 218, is of increased width, vertically, and formed with a clearance opening 229 of generally triangular formation within which the finger 216 may move. The aperture 229 is defined by a straight lower edge 231 extending to a clearance notch 232 only wide enough to accommodate the finger 216. From the notch the aperture is further defined by a curved cam edge 233 which continues to an edge 234 in oblique relation to the edge 231. The aperture 229 is partly covered, on one side thereof, by the interceptor 225 whose upward motion is limited by an integral lug 237 extending laterally of the interceptor under the lever 217. Downward movement of the member 225 relative to the lever 217 is resisted by a tension spring 238 anchored between the lever 217, at the right hand end thereof, FIG. 17, and a lug 239 laterally of the interceptor 224. The center of gravity of the link 223, lever 217, and member 224, collectively, is to the right of the pivot 218, so that said lever and cam are biased clockwise by gravity about the pivot 218.

When the set-down arm 207 is in engagement with the stud 191, the finger 216 is in the notch 232, said finger then supporting the lever 217 against rotation clockwise. When, however, the arm 207 starts its inward movement, the finger 216 is, of course, carried out of the notch 232 and the selector mechanism is able to rock clockwise by its own weight to an extent permitted by the finger 216 as it is moved to the left, FIG. 17, in engagement with the cam edge 233. The swinging of the lever by gravity causes the pad 228 to be elevated. If the turntable 3 is bearing a 10-inch record, which extends beyond the periphery of the turntable, the weight of this record prevents the movement of the pad 228 to an elevation above the level on the turntable.

The upward movement of the pad 228 may be limited to the same extent by both 10 and 12-inch records; this movement falls short of the plane of the turntable top, however, following release of a 12-inch record to the turntable, this limitation being effected by other means, described in the application aforesaid. An angular position differing from the position permitted by the 10-inch record, regardless of whether or not other records smaller than the 12-inch record are between it and the turntable during a record changing cycle, is thus provided. It is apparent that the mechanism will automatically play a stack of 7-inch records or will play a mixture of 10-inch and 12-inch records. Consequent to release of 7-inch records only to the turntable, no obstruction is offered to vertical movement of the reach pad 228 so that it is enabled to reach a level above the top of the turntable. First, second and third positions are therefore provided for the lever 217 which determines the set-down point of the pickup arm for 7-inch, 10-inch and 12-inch records. These positions determine the ultimate position assumed by the finger 216 following its disengagement from the cam surface 233 when the arm 207 is rotated clockwise as viewed in FIG. 14.

The interceptor member 225 includes a series of teeth or fingers 241, 242, and 243 slanting upward and to the right, FIG. 17, from the base of said member thereby providing slots 244 and 246 slanting upward from sockets 247, 248, and 249 at the edge 231 of lever 217. The finger 216 is adapted to be moved out of engagement with the cam surface 233 at a different point along said cam surface as the finger is carried inward, it being understood that the inward movement of the finger is due to the clockwise movement of the set-down member 207. When the finger 216 leaves the edge 233, as when the selector mechanism 214 is in its first position, it engages the tooth 243 and enters the socket 249. The selector mechanism is rotated slightly upward or counterclockwise in the course of this operation due to the curved formation of the edge of the tooth 243. This lowers the pad 228 and affords clearance between the pad and a record for its reproduction. When finger 216 has reached the socket 249, the set-down arm 207 is unable to move farther, and the angular movement of the pickup arm inward toward the center of the turntable is arrested over the beginning of the sound groove of the 12-inch record. The pickup arm remains in this position until the end of the record change cycle when downward movement of the lift pin 183 interrupts the frictional coupling between control member 201 and the set-down arm 207 so that when the pickup arm is lowered into engagement with the 12-inch record, it is freed for tracking the same.

The selector mechanism may also arrest the finger 216 in a second position, if the finger leaves the cam surface 233 at a later point during a cycle than in the operation just described. It will also be noted that the tooth 242 is sufficiently longer than tooth 243 to intercept the finger 216 during its movement to the left when plate 217 is tilted further clockwise. In a manner similar to the operation just described, the pad 228 is then retracted from the 10-inch record by cooperation between the finger 216 and the tooth 242, thus rotating the selector mechanism 214 counterclockwise. The finger 216 coming to rest in engagement with socket 248, the inward motion of the pickup arm is arrested over the beginning of the sound groove of the 10-inch record, engagement of the pickup arm therewith being effected after the lift pin 183 is lowered.

When the selector mechanism 214 is enabled to rotate to the extent permitted by a 7-inch record, the entire edge 233 is engaged by the finger 216 as the latter is carried inward. Then since it is continuous from the edge 233, the edge 234 has cam relationship with the follower 216 in engagement with which the follower is moved as said follower is carried inward, the operation being accompanied by rocking of the selector mechanism 214, counterclockwise about pin 218. Also, the follower 216 is conveyed along the finger 241 to the socket 247 at the base of said finger. Engagement of the follower with the socket 247 is maintained until another change cycle is initiated. In the meantime, the control arm 201 is freed from the set-down arm 207 so that the pickup arm may perform its tracking operation on the 7-inch record, after the lift pin 183 moves downward.

Advantage of the movement of finger 216 to its innermost position is therefore taken to move the seat 152, FIG. 1, into the course of the pusher 149. This is effected by an indexing lever 251 pivoted at 252 to the lower side of the base 2. One end of the lever 251 is arranged to extend into the course of the finger 216 and is formed with a vertical ear 253 for engagement by the finger. The remaining end of the lever 251 extends between a pair of collars 254 and 256 secured to the rod 137. The end of lever 251 between the collars is curved to provide easy sliding contact with the end face of said collars. It will therefore be apparent that by its motion to its innermost position the finger 216 engages the ear 253 to then turn the lever 251 counterclockwise, FIG. 1. This shifts the rod 137 to the right sufficiently to position the seat 152 in the course of the pusher 149 which sequentially, by pressing on the seat, moves the link 63 before it to set the shifter 26 to a position wherein the turntable is operated at a speed of 45 r.p.m.

Movement of the rod 137 to the right has the effect of presetting the lever 132 since during this movement of the rod, the arm 139 engaged the finger 134, moving the latter before it until the lever 132 is again positioned in the orbit of the stud 83.

While the embodiment just described provides turntable speds of 33⅓, 45 and 78 r.p.m., a second embodiment is contemplated by means of which these turntable speeds are available, and additionally, a speed of 16 r.p.m. for playing sets of records commonly referred to as "talking books" intended for the blind. In the second embodiment the first mentioned three speeds are automatically selectable as in the first construction. The fourth turntable speed, however, must be selected manually and once the drive unit is conditioned for operating a turntable at this speed its speed adjustment must be manually altered to again reproduce a record of one of the three other speeds after which the drive unit is again in readiness for selecting automatically one of the first three considered speeds. Also, while the turntable speeds of the first embodiment are automatically selected, the speeds provided by the second embodiment are both automatically and manually selectable.

The second embodiment of the invention, in association with controls therefor, is illustrated in FIGS. 18-29, inclusive. The drive unit per se is indicated, in its entirety, by the reference character 261 and includes all the elements of the unit 16, including a fixed, horizontal motor support plate 262 and a driven, vertical motor shaft 263 extending upward through the plate. A shifter plate 264 is swingable about the shaft 263 and a vertical post 266 is provided, FIGS. 19 and 21, beside the shifter 264, which plate is fixed to the support 262. The post 266 carries, for movement axially thereon, a follower 267 which is biased downward by a compression spring 268 also on the post above the follower. This enables the follower to cooperate with a cam 269 arcuate of the shaft 263. The cam 269 enables the follower 267 to be moved upward to vary the elevation of a floating, rubber tired idler 271, for concurrent engagement with a depending turntable flange 272 and a selected drive pulley later to be referred to. The follower 267 has an integral lateral arm 273 to which an idler carrier or horizontal plate 274 is pivotally mounted at 276. The idler 271 is rotatably supported on a post 277 on the carrier 274 and may have horizontal movement in any direction. It is biased toward the turntable flange 272 by a tension spring 278, FIG. 20, anchored to the plate 274 and the support 262. The idle carrier 274 is formed with an aperture 279 through which a vertical detent pin or keeper 281, carried by an arm below the shifter, extends. One end of the arm 282 is pivoted at 283 to the plate 262 and biased counterclockwise about its pivot by a tension spring 284, FIG. 30, connected between the arm and the plate 26, to urge the keeper 281 into pressure engagement with the shifter 264. At its point of engagement with the keeper 281, the shifter 264 is formed with a plurality of cam notches 285, 286, 287 and 288, into any selected one of which the keeper may be pressed to releasably retain the shifter in a selected position. At the same time the shifter is moved to a different angular position, a different point on the cam 269 is moved under the follower 267 to raise or lower it, and to thus afford a different speed ratio between the motor shaft 263 and the idler 271.

The shaft 263 is connected by a belt 291 to a pulley 290 on a vertical shaft 289, which is carried by the shifter 264. The shaft 289 is therefore arranged to swing about the shaft 263 as the shifter is swung. Since the pulley 290 has a diameter considerably greater than that of the shaft 263 the speed of the shaft is reduced. The shaft 263 is formed at its upper end with a pulley 292, from which the 45 r.p.m. speed is derived. At a level below the pulley 292 the shaft 263 also has a pulley 293 of larger diameter, from which a 78 r.p.m. speed is derived. The shaft 289 has, at its upper end, a pulley 294, from which a 16 r.p.m. speed is derived, intermediate of which and the pulley 289 is an integral pulley 296 from which a speed of 33⅓ r.p.m. is derived. It is therefore necessary to move the idler into driving engagement with one of the pulleys 292, 293, 294 or 296 in order to operate the turntable at one of the foregoing speeds. This is carried out by varying the position of the shifter 264 and concurrently moving an appropriate portion of the cam 269 under the follower 267 to move the idler vertically. The parts as depicted in FIGS. 18, 19 and 21 are arranged for driving the turntable 275 at a speed of 45 r.p.m. The pulley 292 is engaged with the idler 271 during which the keeper 281 is pressed into the notch 285 to releasably retain the shifter in a position for a rise 297, on the cam 269 to be under the follower 267. From its 45 r.p.m. position, it will be assumed, the shifter 264 is moved to its immediately next adjacent position, namely its 78 r.p.m. position in which the notch 285 is carried out of engagement with the keeper 281 and the notch 286 moved into engagement therewith by swinging the shifter counter-clockwise. This movement of the shifter involves movement of the cam 269 to carry a point at the right portion of a dwell 298, FIG. 22, of the cam under the follower 267 for the idler 271 to be lowered into driving engagement with the pulley 293. Additional counter-clockwise swinging of the shifter 264 carries the cam 269 to a position indicated by broken lines in FIG. 22 wherein the notch 287 is swung into holding engagement by the keeper 281 and pulley 296 is carried into driving engagement with the idler 271 to drive the turntable at 33⅓ r.p.m.

When either pulley 296 or 294 is moved into engagement with the idler the latter is moved out of engagement with the pulleys 292 and 293. The reason for this will be evident when it is noted that the arc, on which the shaft 289 is disposed, passes between the motor shaft 263 and axis of the idler 271. Therefore, when the shifter is swung to its 33⅓ r.p.m. position the pulley 296 is pressed with sufficient force against the idler to move it out of engagement with pulleys of the shaft 263, as shown in FIG. 20.

By swinging the shifter counter-clockwise still farther from its 33⅓ r.p.m. position the notch 288 is carried into operative engagement with the keeper 281 and concurrently a rise 299, FIG. 23, on the cam 269 is carried under the follower 267. The latter operation elevates the idler into driving engagement with the pulley 294 so that the turntable then attains a speed of 16 r.p.m., the pulley 294 retaining the idler out of engagement with pulleys of the shaft 263.

When the keeper 281 is between notches during swinging of the shifter 264 counter-clockwise, the keeper is, of course, swung farther from the motor shaft 263. During this outward movement the keeper engages the carrier 274, at the outer edge of the aperture 279, and by pressing it outward moves the idler clear of the junctions of the pulleys 292 and 293 and junctions of pulleys 294 and 296.

The shifter 264 is formed with a slot 301 therein, arcuate of the shaft 263, in which is received a stud 302 fixed to the plate 262 to limit the swing of the shifter.

The unit 261 is supported from a base plate 303 near one corner of which is carried a vertical control shaft 304, FIG. 27, in a bearing 306, FIG. 29, fixed to the base plate. Above the base 303, the shaft 304 carries a control knob or handle 307 while below the base the shaft bears, fixed thereto, a vane or combined indicator and crank plate 308. The latter is offset upward at 309 to provide a vane for contiguous relation to the bottom of the base in order that a plurality of indicia 16, 33, 45, 78 and N on the vane may be readily observable through an aperture or window 311 in the base 303. The knob is a link in a manual control mechanism for adjusting the position of the shifter 264 and to indicate the several settings of the shifter.

The indicia "N" or "NO" on the vane 308 is indicative of an additional setting for the shifter 264. It is a setting in which both shafts 263 and 289 are out of driving relation to the idler 271 and is made possible by an additional notch 312, on the shifter between the notches 287 and 288. By its cooperation with the keeper 281, the notch 312 releasably retains the shifter in a position wherein pulleys of the shafts 263 and 289 are both spaced from the idler 271. The advantage of this setting will be apparent when it is stated that the idler 271 is formed with a periphery of rubber which is subject to deformation when held under pressure for a long period of time. Therefore, if the foregoing mechanism is adjusted to its "N" setting, the record player may be stored for long periods without fear that pressure of one of the pulleys of the shafts 263 or 289 on the idler may be eventually responsible for a dent or flat on the idler liable to impair the reproducing quality of the record player.

In order that the shifter 264 may be swung by turning the knob 307, the vane 308 is pivotally coupled at 313 to a link 314 which, in turn, is pivotally coupled at 316, below a depression or well 315 in the base plate, to a lever 317. The lever 317 is formed with an offset at 318 where it is extends upward through an aperture 319, FIG. 27, in the base plate 303. A tongue 321, projects into the aperture, and the lever 317 is pivoted at 322 to the tongue above the depression 315. The shifter 264 is formed with an arm 323 connected to the lever 317 by a pin and slot. It will now be apparent that the operation of the unit 261 may be varied manually by turning the knob 307. For example, turning the knob counter-clockwise, swings the lever 317 clockwise, to in turn swing the shifter 264 counter-clockwise.

Mechanism for automatically turning the shifter 264 to a predetermined position includes a cam arm 326 extending laterally of the lever 317. The cam arm 326 is arranged to cooperate with a follower 327 at one end of a preset lever 328, the latter being swingably supported on a post 329, to extend into the orbit of a vertical pin or operating member 331 on the bottom of a mutilated gear 332. During operation of the gear 332 the pin 331 is carried into engagement with the lever 328 which the pin presses out of its course by swinging the lever clockwise and during its motion the lever 328 communicates motion to the lever 317 which is swung counterclockwise due to cooperation between the cam 326 and follower 327. Concurrent with these operations the shifter is moved to its 45 r.p.m. position shown in FIG. 18.

The shifter is thus moved to the 45 r.p.m. setting, regardless of whether immediately preceding a cycle a 33⅓ r.p.m. record or a 78 r.p.m. record was reproduced. If a cycle of the gear takes place between playing of two 45 r.p.m. records, the lever 317 and arm 328 are not displaced from their 45 r.p.m. settings. The 45 r.p.m. setting of the shifter 264 is therefore a preset position from which the shifter may be moved to some other setting automatically by means now to be described.

The means includes a gauging or test link 333 corresponding to link 147 of the first embodiment. One end of the link 333 is pivoted at 334 to a lateral arm 336 of the lever 317 while the remaining end is free and formed with a first notch or seat 337 and a second seat 338 at the left thereof, the latter being in greater proximity to the pivot 334 than the seat 337. Both seats are for intermittent cooperation with a pin or pusher 339 on the end of a latch lever 341 swingably supported on a vertical post 342 beside the gear 332. The lever 341 is biased into the course of the stud 331 by a spring 343 and is formed with a cam 344 for cooperation with the follower 331 whereby the lever is rocked against force of the spring during a cycle. The lever 341 also has a notch 346 to engage the follower 331 when a cycle of the gear has been completed to releasably secure the latter against turning during reproduction of a record.

The link 333 is swung counter-clockwise to an extreme position at every cycle of the gear 332. This extreme position may be regarded as a preset position and is effected by a preset lever 347 pivoted at 348 and positioned for one end thereof to extend into the orbit of the operating member 331. The remaining arm of the lever 347 is bent downward to provide a vertical finger 349 extending through an arcuate clearance aperture 351 in the base plate and be in a position between parallel arm portions 352 and 353 of an offset 354 in an indexing rod 356, for the most part, below the base plate. The rod 356 is further offset adjacent the link 333 to extend upward through an aperture 357, in the base plate, and thence over the link 333 to which the rod is pivotally coupled at 355. It will therefore be apparent that as the follower 331 is carried through its course, it engages the lever 347 which is moved before and by the follower out of the course of the latter by being swung clockwise. As the lever 347 is thus turned, its end 349 is swung into pressure engagement with the arm 353 of the rod 356 to effect longitudinal displacement of the latter to the left and, of course, to swing the link 333 counterclockwise to a preset position thereof.

The movement of the rod 356 to its extreme position, as just indicated, also has the effect of presetting a selector or indexing lever 359 swingable about a pivot 360. One end of the lever 359 extends between a pair of collars 361 fixed to the rod 356 while the other end of the lever is formed with a vertical finger 362 for cooperation, as will be later indicated, with a selector finger 363, an element identical in form and function with the finger 216 of the first embodiment.

The movement of the rod 356 to its extreme position at the left also has the effect of moving a detector or indexing lever 364, FIG. 26, to a preset position therefor, indicated by broken lines in FIG. 26. The lever 364 is pivoted at 366 to swing about a horizontal axis and extends through a clearance aperture 367 in the base plate. Adjacent the aperture 367, the rod 356 is slidably supported from the base plate by a bracket 368, and bears at its end a collar 369. When the rod 356 is moved to the left the collar 369 presses against one end of a reversing lever 371 thereby swinging it counter-clockwise about a pivot 372.

During the operation, the opposite end of the reversing lever presses on the lower end of the lever 364 to move it from its full line to its broken line position, FIG. 26. The detector lever 364 is for cooperation with a handle 373 associated with a tone arm 374. More specifically the handle 373 extends from a transducer on the tone arm and is swingably about an axis longitudinally of said arm, to alternately extend and/or retract one of two stylii 376 and 377 in diametrically opposed relation to each other. The needle 376 is for tracking coarse groove records while needle 377 is for tracking micro-groove records. In accordance with the second embodiment, and at variance with the first described embodiment, the handle 373 extends outwardly, that is, away from the axis of the turntable when the coarse groove needle 376 is in readiness for tracking a record and the micro-groove needle 377 is extended downward when the handle 373 is pointing inwardly from the tone arm.

When a 45 r.p.m. record is in readiness for reproduction at the end of a cycle the link 333 is first swung to its preset position following movement of the shifter to its preset or 45 r.p.m. position. And because the 45 r.p.m. record is of the micro-groove variety the transducer handle 373 is arranged on the inner side of the pickup arm 374. But the finger 363 is swung inwardly into engagement with the finger 362 after the follower 331 passes the lever 347 and before it engages the cam 344 the result of which is counter-clockwise motion of the lever 359 and movement of the rod 356 to the right to swing the link 333 clockwise about its pivot 334. This motion of the link 333 is only far enough to carry the seats 337 and 338 to the right of the arc through which the pusher 339 is carried during an oscillation of the lever 341. Consequently, the 45 r.p.m. position of the shifter 264 is not disturbed, there being no cooperation between the pusher and link 333. Also, since the tone arm 374, in the course of a cycle, does not swing outward far enough to engage the lever 364, in its preset position, there is no movement thereof nor of the reversing lever 371. Consequently, the turntable is rotated at 45 r.p.m.

When a 78 r.p.m. record is in readiness for reproduction at the end of a cycle, the handle 373 must be arranged on the outside of the pickup arm, a record of this description being of the coarse groove variety. During the cycle preparatory to playing this record the test link 333 is swung to its preset position by the means just indicated, as is also the selector lever 359 and detector lever 364. As, however, the pickup arm 374 is moved to its outermost position the tip of handle 373 is carried into engagement with the lever 364 which is rocked clockwise from its preset position to its position indicated by full lines as in FIG. 26. In this operation the lever 364 turns the reversing lever 371 clockwise slightly, FIG. 24, to in turn move the rod 356 to the right from its preset position, and the gauging link 333 for an angular distance less than it was moved when a 45 r.p.m. record was about to be played. This movement of the test link 333 is just enough to swing it with the seat 338 into the arc of the pusher 339. Consequently, when the seat 338 is engaged, by the pusher, the link 333 is moved longitudinally by the latter to swing the shifter 264 counter-clockwise from its preset position to its 78 r.p.m. position by moving the lever 317 clockwise.

During these preparations for reproduction of a 78 r.p.m. record, the detector lever 359, although moved with the collars 361, is not engaged by the finger 363 since in playing 78 r.p.m. records, available in 10-inch and 12-inch sizes only, the finger 363 is not carried inward as far as the preset position of the finger 362.

When a 33⅓ r.p.m. record is in readiness for reproduction at the beginning of a cycle the shifter 264, and other elements aforesaid, are first moved to their preset positions as when 78 and/or 45 r.p.m. records were on the turntable, the stylus 377 having been arranged in its downward position by swinging the handle 373 to the inner side of the pickup arm prior to the cycle. The link 333 then remains in its preset position since there is no engagement between the tone arm and lever 364 in its preset position. Nor is there engagement of the finger 362 by the finger 363 since 33⅓ r.p.m. records are presently manufactured in 10-inch and 12-inch sizes only and when records of either of these sizes are reproduced the finger 363 is not carried inward far enough to cooperate with the finger 362 even when the latter is in its preset position. When the test link 333 is in its preset position, the seat 337 is in the arc of the pusher 339. Therefore when the pusher is operated, it moves the link before it by engaging the seat. And since the seat 337 is in closer proximity to the pusher than is the seat 338 the link 333 is moved longitudinally farther than for a 78 r.p.m. record and swings the shifter a greater angular distance from its 45 r.p.m. position to its 33⅓ r.p.m. setting.

When a 16 r.p.m. record is in readiness for reproduction, the shifter 264 is, as has been indicated, moved to its 16 r.p.m. position. This is done manually by turning the handle 307 counter-clockwise to move the link 333 to its most remote point from the pusher 339 by swinging the lever 317 clockwise. In this position, the link 333 is beyond the extremity of the arc through which the pusher 339 is carried during a cycle.

It is also desirable that the gear 332 be retained in its record reproducing position, in other words, out of mesh with a driven pinion 378 at the axis of the turntable, the pinion being integral with a striker or spur 379 for engagement by an upright lug 381 on a trip member 382, a counterpart of the member 74 of the first embodiment. Additionally, the member 382 is formed with a second upright lug or stop member 383 for cooperation with a stop link 384 one end of which is pivoted at 386 to the lever 317. The link 384 is formed, intermediate its ends, with a slot 387 through which the post 329 passes and on which the lever 384 is slidably anchored by any suitable means. When the shifter is in one of its settings other than 16 r.p.m. the free end of the link 384 is spaced from the lug 383 regardless of the position of the latter. When, however, the shifter is swung to its 16 r.p.m. setting and the lever 317 consequently swung clockwise to one of its extreme positions, the link 384 is concurrently slid relative to the post 329 about which the link also turns slightly until its free end is intimately associated with the lug 383 at which time the lug 381 is in its position remote from the striker 379. The trip member 382 is coaxially associated with a second trip member 388, rotated counter-clockwise by the tone arm by means described in the copending application as said arm reaches the trip groove of the record it is tracking. Since to move counter-clockwise from its record playing position into the orbit of the striker 379, the member 382 ordinarily receives its motion frictionally from the member 388 the friction between the members is overcome by the link 384 at the end of reproduction of a record to preclude movement of the lug 381 into the orbit of the striker.

Once a 16 r.p.m. record is on the turntable and the latter is operating at this speed, the pickup arm is manually brought into engagement with the beginning of the record, the fine groove needle 377 being downward for tracking the record. When reproduction of the record is completed, the tone arm is manually removed from the record and swung outward far enough for removal of the record. If the record has a recording on both sides it must, of course, be manually inverted when the pickup arm 374 is again manually brought into tracking relation to the remaining side of the record.

For starting the motive unit 261, the second embodiment includes a combined switch operating and reject lever 392. It is identical with the lever 112 of the first described embodiment and is operated from a second control knob 393 at the front of the base plate 303. The knob 393 is on the upper end of a vertical shaft 394, the lower end of which bears a crank arm 396. The shaft is journalled in a bearing 397, on the base plate, and when rotated communicates its motion to the lever 392 by a link 398 pivoted to the crank at 399 and to the lever by a pin 401 passing through a slot 402 in the base 303.

While I have described my invention in different embodiments thereof, I am aware that extensive other departures may be made therefrom without departing from the spirit or scope of the idea.

I claim:

1. In an automatic record player in which a turntable is driven by a multiple speed motor drive unit having a speed shifter swingable between a preset position in which one turntable speed is provided and another position in which another turntable speed is provided, an actuator supported to be carried cyclically through an orbit following rejecting of a record of one description, a first lever mounted adjacent the shifter and having an end thereof coupled to said shifter, a second lever mounted between said first lever and said orbit, said second lever having an end portion for extension into said orbit during record tracking but being pressed out of said orbit by said actuator during a cycle, a cam on one of said levers, a follower on the other of said levers for cooperation with said cam whereby movement of said second lever out of said orbit is imparted to said shifter for moving it to a new setting for operating the turntable at a different speed thereby to reproduce a record of a different description.

2. In an automatic record player in which a turntable is driven by a multiple speed motor drive unit having a speed shifter swingable from a preset setting to a plurality of other settings in each of which the turntable is driven at a different record playing speed and cyclical means is mounted to turn through a revolution when a record is rejected, an actuator on said cyclical means thereby carried through an orbit, a latch mounted beside the orbit, said latch being biased into latched engagement with said actuator to latchably restrain said cyclical means from rotation during record tracking, said latch being moved by pressure of said actuator thereon at the end of a cycle in moving into latched engagement therewith, a pusher on said latch, said latch by its movement oscillating said pusher in a predetermined course, a first preset linkage coupled to the shifter and including a first arm to extend into the course of said actuator during record tracking, said arm being pressed out of said course by said actuator during a cycle to move said shifter to its preset setting, a gauging link having one end thereof anchored to said linkage and its other end formed with a pusher seat arranged for engagement by said pusher whereby said gauging link may be pressed to a displaced position and its displacement communicated to said shifter for a new setting thereof, and a second preset mechanism mounted beside said cyclical means and connected to the gauging link and including a second arm to extend into said orbit during record tracking but to be engaged by said actuator following its cooperation with said first arm to press said second arm out of said course and thereby move said pusher seat clear of the course of said pusher by swinging said gauging link about its anchorage thereby to preserve the preset setting when a record of one description is on the turntable.

3. In a phonograph apparatus as described comprising a turntable driven by a multispeed motive unit and having a speed shifter swingable to a plurality of settings in each of which a different playing speed is imparted to the turntable on which records are tracked by a tone arm having at least one needle thereon and during a cycle is swung to an outermost point by operation of cyclically operating means and inward from said point by a spring-biased setdown arm, an actuator on said cyclically operating means carried orbitally thereby, a latch lever mounted beside said cyclically operating means, a pusher on said latch lever, said latch lever being biased for latched engagement with said actuator to restrain said cyclically operating means from operating cyclically during record tracking and being swung by said actuator in moving into latched engagement therewith at the end of a cycle to also oscillate said pusher through a course, preset means including an arm to extend into the course of said actuator and be thereby pressed from said course during a cycle, a linkage coupling said preset means to said shifter for movement of said arm from said course to move said shifter to a preset position, and a gauging link having an end thereof anchored to said linkage and its opposite end formed with a pair of seats angularly spaced relative to its anchorage and therefrom spaced at differing distances, the anchorage of said gauging link providing for it to be swung in one direction to a perset position thereof clear of the course of said pusher to preserve the preset setting of said shifter and thereby provide for tracking of a 78 r.p.m. record, said gauging link being swingable from its preset position in the opposite direction through one increment of angular motion to carry one of the seats into the pusher course to receive motion from said pusher for being displaced longitudinally for one increment of motion to move said shifter to another setting for operating said turntable at a 33⅓ r.p.m. speed in response to movement of said pickup arm to its outermost point, said gauging link being swingable through another increment of angular motion from its preset position to carry the other of said seats into the course of said pusher in response to movement of said set-down arm to its innermost position thereby providing for longitudinal movement of said gauging link for a different increment of motion by said pusher to move said shifter to a setting for operating said turntable at a 45 r.p.m. speed.

4. In an automatic record player having a pickup arm mounted to track records differing in playing speeds on a turntable drivable at a plurality of speeds by a multispeed motive unit having a speed shifter movable from a preset position to a plurality of other positions in each of which the turntable is operated at a different speed and relative to said turntable said pickup arm is swingable to an outermost point by cyclical rotary means when a record is rejected and inwardly to a selected set-down point by an inwardly-biased set-down arm connected to swing with said pickup arm, means by which a turntable speed is automatically selected for a record of given playing speed, comprising an actuator on and eccentric of said cyclically rotated means for orbital operation, a latch mounted beside the orbit, said latch being biased into the orbit of said actuator for restraining said cyclical rotary means from operation during record tracking by latchably engaging said actuator, a pusher on said latch, said pusher being oscillated through a course at the end of a cycle of said cyclical rotary means by movement of said actuator into latching cooperation with said latch, a first preset linkage including a first arm to extend into the course of said actuator and be thereby pressed from said course during a cycle to preset said shifter, a gauging member anchored to said linkage and having spaced at differing distances from its anchorate point a pair of seats for engagement by said pusher, a second preset linkage mounted beside the course of said actuator and including a second arm to extend into the course of said actuator and be thereby pressed from said course following cooperation of said first arm with said actuator an operating rod having an end thereof anchored to said gauging member and extending past said second preset linkage and being formed for displacement by said second linkage when it is operated by said actuator to swing said gauging member to a preset position wherein both of said seats are clear of the course of said pusher, movable means including a detector lever mounted outwardly of the outermost point to which said pickup arm is swung cyclically and being connected to said control rod, said control rod being moved to move one of said seats into the course of said pusher by pressure engagement of said pickup arm with said detector lever thereby for operation of said pusher to engage said one seat and press said gauging member through one increment of motion to swing said shifter to one speed setting for the turntable, and a third lever coupled at one end thereof to said operating rod and pivoted between said operating rod and said set-down arm and having an end extending into the course through which said set-down arm is moved when a record of another playing speed is on the turntable for pressure engagement by said set-down arm to swing said gauging member a greater distance from its preset position by moving said operating rod to carry the other of said seats into the course of said pusher and for said pusher to move said gauging member longitudinally for another increment of motion to swing said shifter to a setting wherein said turntable is operated at an alternate playing speed for reproducing another record.

5. In an automatic record player in which a turntable is driven by a multiple speed motive unit having a speed shifter swingable between one setting and another setting in both of which the turntable is operated at a different speed and a pickup arm is mounted to track a record on said turntable and during a cycle is swung to an outermost position and therefrom is swung inwardly by a set-down arm biased to an innermost position and coupled to said pickup arm for moving said pickup arm to a set-down point over the beginning of a 45 r.p.m. record, an actuator supported to be carried orbitally during a cycle, a latch mounted beside the orbit of said actuator to restrain said actuator from being moved orbitally by latched engagement therewith during record tracking, a pusher on said latch, said pusher being oscillated in a course by said actuator in moving into latching cooperation with said latch at the end of a cycle, a gauging link linked at one end thereof to said shifter and having its remaining end formed with a seat normally out of the course of said pusher, an indexing lever adjacent said set-down lever, and a control rod connected to said gauging link and to one of the ends of said indexing lever, the other end of said indexing lever being arranged for engagement by said set-down lever in moving to its innermost position and to be thereby pressed to a different position for concurrently moving said control rod longitudinally and for swinging said gauging link laterally to carry said seat into the course of said pusher for pressure exerted thereby on said seat to move said gauging link longitudinally and swing said shifter to a setting in which the turntable is driven at a speed of 45 r.p.m.

6. In an automatic record player in which a multispeed motive unit has a shifter mechanism movable to a plurality of settings in each of which the unit operates a turntable at a different speed and a tone arm mounted for tracking records on the turntable is swingable to an outermost point by cyclically operating means when a record is rejected and is coupled to a set-down arm biased to swing the tone arm inwardly from its outermost point to a selected set-down point and one of a pair of styli on the tone arm for fine and/or coarse grooved records is alternately movable to record-tracking positions by moving a handle between an inner and/or outer side of the tone arm, means to automatically adjust the turntable speed for a record of a class last delivered to the turntable comprising an actuator fixed to said cyclically operating means eccentrically thereof for movement through an orbit cyclically, latch means mounted beside said orbit to releasably secure said cyclically operating means against motion during record tracking by latched engagement with said actuator, a pusher on said latch means, said actuator at the end of its course oscillating said pusher in a course thereof by being carried into latched engagement with said latch means, a shifter preset mechanism coupled to said shifter and including an arm extending into said orbit during record tracking but mounted to be moved from said orbit by pressure on said arm by said actuator during a cycle to shift said shifter to a preset position, a gauging link having one end thereof anchored to said shifter mechanism for longitudinal movement by said shifter mechanism in shifting between settings thereof and being formed at its other end with a pair of pusher seats severally engageable by said pusher to receive therefrom longitudinal motion on operation of said pusher for moving said shifter differing angular distances from its preset setting to other settings, a control rod beside said cyclically operating means and having an end anchored to said gauging link, a control rod preset mechanism mounted between said control rod and said cyclically operating means and including an arm extending into said orbit during record tracking but being pressed out of said course by said actuator following its cooperation with said preset shifter, said control rod being formed for movement in one direction by pressure thereon by said control rod preset mechanism when it is moved by said stud to swing said pusher seats clear of the course of said pusher thereby for said shifter to remain in its preset setting and provide for operation of said turntable at a speed suitable for coarse groove records, a handle detector mechanism including a detector lever mounted beside the outermost position of said tone arm, said handle detector mechanism being operatively coupled to said control rod for movement of said detector lever to a preset position thereof by movement of said control rod in said one direction to a preset point, said detector lever when preset being slightly beyond a point for engagement by the tone arm when a coarse point stylus is extended and the handle is on the inner side of the tone arm at the time of its movement to its outermost position, said handle being moved to the outer side of said tone arm to extend said fine point needle and engage said detector lever to press it from its preset position for moving said control rod for one distance in another direction for restoring said control rod preset mechanism to the course of said actuator and concurrently for swinging said gauging link away from its preset position to move one of said seats into the course of said pusher and receive one increment of longitudinal movement therefrom to move said shifter to a 33⅓ r.p.m. setting, and a lever mounted intermediate the course of said set-down arm and said control rod and having one end in coupled relation to said control rod and its other end arranged to be engaged by said set-down arm in moving to an innermost position thereof for moving said gauging link additionally away from its preset position thereby to station the other of said seats in the pusher course and receive a different increment of longitudinal movement from said pusher for moving said shifter to a point wherein the turntable is operated at a speed of 45 r.p.m.

7. In automatic record player comprising a turntable driven by a multispeed motive unit and having a speed shifter swingable to a plurality of settings in each of which a different speed is imparted to the turntable on which records may be tracked by a tone arm having thereon fine and coarse groove styli, said tone arm being swingable during a cycle to an outermost point by means operated cyclically and inward by a spring-biased set-down arm coupled to the pickup arm during a cycle, an actuator carried through an orbit by said means, a latch beside said means, a pusher on said latch, said latch being biased to restrain said means from cyclical operation during record tracking by latched engagement with said actuator but moved by said actuator when said actuator is carried into latching cooperation with it at the end of a cycle to oscillate said pusher through a course, a linkage including a gauging link connected to said shifter and anchored at one end thereof and movable longitudinally for moving said shifter between settings and having a remaining free end at the course of said pusher, said free end being formed with a pair of seats differing in their spacing from the anchored end and also spaced angularly relative to said anchored end, an indexing rod beside said means, said indexing rod being connected to said gauging link and being movable longitudinally to move said seats laterally of said pusher course, a pair of spaced preset members mounted to extend into said orbit during record tracking and be pressed out of said orbit consecutively by said actuator during a cycle, one of said preset members being associated with said linkage for exerting pressure thereon by movement of said one preset member out of said orbit to move said shifter to a preset setting and said indexing rod being formed to concurrently receive motion from the other of said preset members in moving out of said orbit to swing said seats clear of the course of said pusher, a handle on said tone arm, said handle being mounted to be positioned on the inner side of said tone arm for extending a coarse groove stylus but moved to the outer side of said tone arm to extend the fine groove stylus and concurrently retract said coarse groove stylus, a first index lever mounted slightly beyond the outer extremity to which said tone arm is swung cyclically, second movable means in communication with said first index lever and said index rod for transferring movement of said index rod to said first index lever for presetting it, arrangement of said handle on the inner side of said tone arm being ineffective for moving said first index lever from its preset position thereby for a cycle to be completed without positional change of said shifter from its preset setting for reproduction of a coarse groove record, arrangement of said handle outwardly of said tone arm engaging said first preset lever and pressing it out of its preset position during a cycle to move said index rod for one increment of motion away from its preset position and swing one of said seats into the course of said pusher for said pusher to press said gauging link through one increment of motion to move said shifter to another setting for operating the turntable at a speed suitable for reproducing a fine groove record of one reproductory speed, movement of said index rod through said one increment serving to press said other preset member into said orbit and said linkage pressing said one preset member into said orbit thereby conditioning said shifter and said gauging link for return to their preset positions in the succeeding cycle, and a second indexing lever in coupled relationship to said index rod, said second index lever being mounted to be displaced by said set-down arm in moving to its innermost point to move said index rod for an additional increment after it has been moved through said one increment to swing said other seat into the course of said pusher for cooperation between said pusher and said other seat to move said shifter to an additional setting from its preset setting thereby providing for operation of said turntable at a different fine groove record playing speed.

8. In an automatic record player in which a turntable is driven by a multiple speed motor drive unit having a speed shifter swingable from a preset setting to a plurality of other settings in each of which the turntable is driven at a different record playing speed and cyclical means is mounted to turn through a revolution in response to operation of a trip on said cyclical means when a record is rejected, an actuator on said cyclical means thereby carried through an orbit, a latch mounted beside the orbit to preclude motion of said cyclical means during record tracking by latchably cooperating with said actuator but thereby pressed from said course at the end of a cycle in moving into latched engagement therewith, means by which the turntable speed may be automatically and/or manually selected comprising a pivoted member coupled to said shifter, first and second preset levers having ends to extend into said orbit during record tracking and arranged to be consecutively pressed from said orbit during a cycle by said actuator, said first preset lever being associated with said pivoted member for turning said pivoted member to a preset point at one extreme positional setting therefor, a gauging link anchored to said pivoted member and having a free end formed with at least one seat thereon for association with said pusher course, a control link beside said cyclical means, said control link being coupled to said gauging link and being formed to receive motion for moving in one direction from said second preset lever by motion of said second preset lever out of said orbit to in turn swing said gauging link in one direction to a preset position wherein said seat is in the orbit of said pusher for said pusher to move said gauging link longitudinally before it during a cycle by pressing on said seat to swing said pivoted member and turn said shifter to another setting for reproducing a record of one description, a speed indicator adjacent the turntable, said speed indicator being linked to said pivoted member and having turntable speed calibrations thereon and being provided with a handle for selectively turning said calibrations to a viewing point and concurrently swinging said pivoted member to move said shifter to another extreme setting at which a record of another description may be reproduced, and a stop link anchored to said pivoted member and having a free end, said stop link being slidably supported at a point between its anchorage and its free end for movement of said pivoted member to said other extreme position to move the free end of said stop link into stopping relationship to said trip thereby to preclude operation of said trip when reproduction of the record of said another description has been reproduced.

9. A record player having a multispeed drive unit for operating at a selected speed a turntable on which fine and/or coarse grooved records may be played by a pickup arm bearing a pair of alternately extendable stylii, the drive unit having a speed shifter swingable to a plurality of settings relative to a preset setting in which the turntable is operated at one speed and after a record is rejected the pickup arm is swung cyclically to an outermost point beside the turntable in response to turning of a rotary member through a single revolution, means by which the turntable speed may be automatically selected during a cycle in accordance with the needle extended comprising a handle in communication with said stylii, said handle being movable between alternate extreme positions inwardly and/or outwardly of said pickup arm for extending one and concurrently retracting the other of said stylii, a first linkage extending from a point slightly outward of the outermost point to which said pickup arm is swingable and being arranged to remain in a preset position during cyclic movement of said pickup arm after said handle is positioned on the inward side of said pickup arm but being movable out of its preset position during a cycle by pressure thereon of said handle after said handle is positioned on the outer side of said pickup arm, an actuator arranged on said rotary member eccentric of the axis thereof for orbital cyclic movement, latch means beside said rotary member, said latch means being mounted to be rocked by pressure thereon of said actuator at the end of a cycle pursuant to a latched relationship between said latch means and said actuator to secure said rotary member against rotation during record tracking, a second linkage coupled to said speed shifter and having a free end associated with the course through which said latch means is rockable, said first linkage being coupled to said second linkage at a point thereon in proximity to said free end for said free end to be swung into the course of said latch means by said first linkage during its movement away from its preset position for said second linkage to receive motion from said latch means to shift said shifter to another setting, a first preset member movably mounted between said second linkage and said rotary member for movement by said second linkage into the orbit of said actuator during movement of said second linkage by said latch means, said first preset member being pressure engaged by said actuator during a succeeding cycle to convey motion to said second linkage for moving said shifter to its preset setting, and a second preset member movably mounted beside said rotary member, said second preset member being arranged to be moved into the orbit of said actuator by said first linkage in moving away from its preset position and being moved out of said orbit by said actuator following cooperation between said actuator and said second linkage to return said first linkage to its preset position and swing said free end out of the course of said latch thereby to preserve the preset setting of said shifter for operation of said turntable at said one speed.

10. A device as described in claim 1 wherein indicator means is coupled to the first lever for movement to different positions in each of which a different turntable speed is indicated.

References Cited in the file of this patent

UNITED STATES PATENTS

| | | |
|---|---|---|
| 2,689,734 | Wennerbo et al. | Sept. 21, 1954 |
| 2,718,399 | Martin et al. | Sept. 20, 1955 |
| 2,841,399 | Guest | July 1, 1958 |